March 11, 1952  W. H. ZINN  2,588,789
NEUTRON DETECTOR
Filed May 22, 1945

Witnesses:
Herbert E. Metcalf
Paul J. Glaister

Inventor:
Walter H. Zinn
By Robert A. Lavender
Attorney

Patented Mar. 11, 1952

2,588,789

UNITED STATES PATENT OFFICE 2,588,789

NEUTRON DETECTOR

Walter H. Zinn, Chicago, Ill., assignor to the United States of America as represented by the United States Atomic Energy Commission Application May 22, 1945, Serial No. 595,188

4 Claims. (Cl. 313—93)

The present invention relates to neutron responsive apparatus, and particularly to neutron density responsive devices adapted for use in connection with the control and protection of neutronic reactor systems.

A neutronic reactor system, as the term is used herein, constitutes a complete system designed for initiating and carrying out chain nuclear reactions. Such systems includes a neutronic reactor, wherein neutrons are developed by fission of a chain reacting material and wherein such neutrons are reserved for sustaining the reaction, control apparatus for initiating and controlling the progress of the reaction, and shielding means for protecting the operating personnel from the radiations developed during the operation of the system.

The usual neutronic reactor comprises a plurality of bodies of chain reacting material, such as uranium metal, arranged in a symmetrical, spatial lattice with a suitable moderating substance such as carbon, heavy water, oxygen, or beryllium occupying the interstices of the lattice. The moderating substance has the function of slowing down the fast neutrons released as an incident to the fission process, thereby making available thermal or low energy neutrons which are capable of producing further fissions and thus continuing the reaction.

The power being developed in a neutronic reactor system at any particular instant is, in general, proportional to the neutron density existing at that particular time within the reactor unit of that system. Neutron density responsive devices thus constitute a convenient means for determining the power output of a neutronic reactor system and for controlling the operation of safety or indicating means associated therewith.

The present invention is concerned with apparatus of this character, and has for a principal object the provision of a novel, simple, reliable, neutron density responsive device which is operable, substantially instantaneously, when the neutron density reaches a predetermined level to effect the operation of associated control or indicating means.

A further object of the invention is to provide a novel neutron density responsive means constructed in accordance with the foregoing object which shall be capable of restoring itself to an operative condition in the minimum possible interval of time following each operation thereof.

As will hereinafter appear, these objects are accomplished by the provision of neutron density responsive unit which is operable to produce a spark discharge of substantial current magnitude when the neutron density reaches a predetermined value. The various novel constructional features and combinations which contribute to the successful operation of the apparatus of the invention, and a more complete exposition of its principles and mode of operation, are made apparent in the following description and the accompanying drawing of one preferred embodiment thereof.

Figure 2:
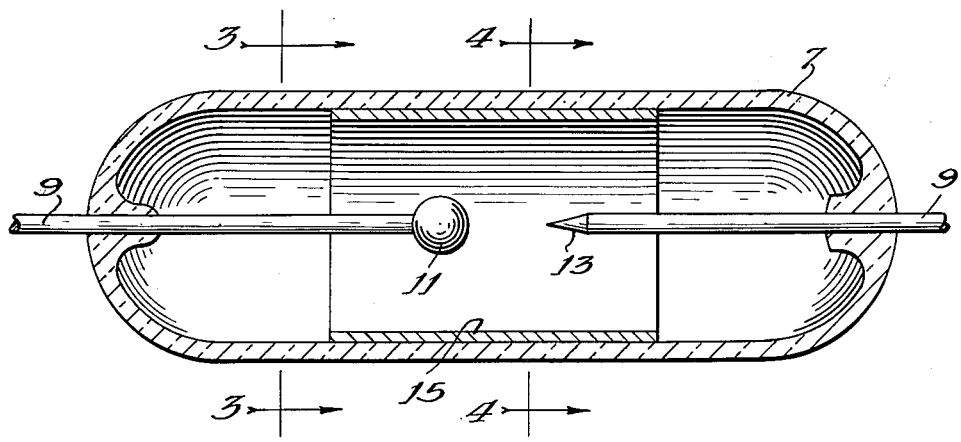
Fig. 2 is an enlarged longitudinal central sectional view, partly in elevation, of the neutron density responsive device constituting a part of the system shown in Fig. 1.
Figure 3:
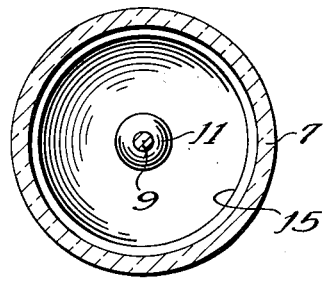
Figure 4:
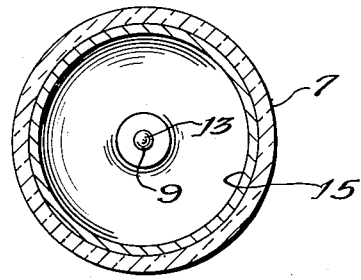

Figs. 3 and 4 are, respectively, sectional views on the lines 3—3 and 4—4 of Fig. 2.

The neutron density responsive device of the present invention comprises, essentially, a closed vessel which contains as an atmosphere a quantity of gas or vapor which is ionized during operation, and a pair of spaced electrodes. The vessel also contains means, such as a quantity of boron, which emits an ionization producing radiation when subjected to neutron irradiation. In use, the device is positioned to receive neutron radiation from a neutronic reactor, or other neutron source, and is connected in an electrical circuit of such characteristics that ionization of the gas contained within the vessel will produce a spark discharge between the electrodes, and the current flow which results from this spark breakdown is utilized to actuate a relay or other current responsive device which in turn effects the operation of the indicating or control means with which the apparatus is associated. The system also includes means for interrupting the discharge after a short interval of time in order to restore the device to operative condition.

The particular neutron density responsive device illustrated in the drawing includes a tubularly shaped glass envelope 7 which is sealed and which contains air or other gas or vapor at atmospheric pressure. Rod-like electrodes 9 are sealed into the opposite ends of the tubular envelope 7, in approximate axial alignment with each other and centrally of the envelope 7. The inner ends of the electrodes 9 are spaced apart, and it is desirable that one of the electrodes terminate in a rounded end and the other terminate in a pointed end, as illustrated at 11 and 13. In one particularly satisfactory embodiment of the device utilizing air as the ionizable gas, the tubular envelope 7 had a diameter of ¾ inch and a length of 6 inches, and the electrodes 9 were spaced apart approximately ¼ inch.

In order to accomplish ionization of the gas contained within the sealed envelope 7 in response to neutron density of a predeterminable magnitude, the tube 7 contains a material which is capable of emitting an ionization producing radiation when subjected to neutron irradiation. Under high density neutron irradiation the electrode material satisfies these requirements, but in the embodiment of the invention illustrated, the ionization producing material comprises a thin layer 15 of boron applied to the inner surface of the glass tube 7 by vaporization, sputtering, or other conventional procedures. The coating 15 is located centrally of the tube 7 and extends well paste the spaced inner ends 11 and 13 of the electrodes 9.

Figure 1:
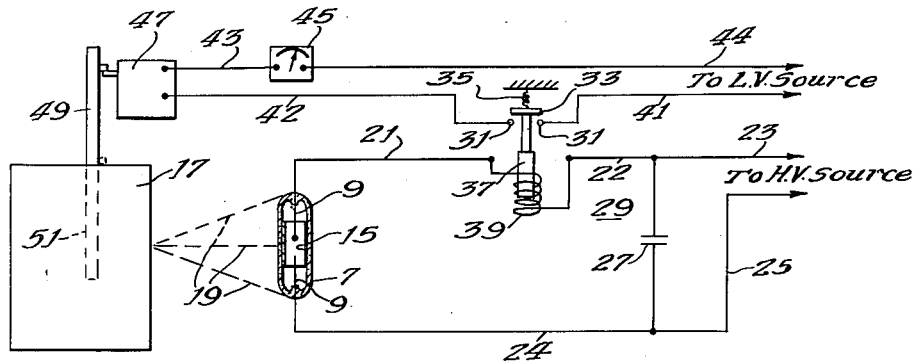
Fig. 1 is a diagrammatic view of a neutronic reactor control system utilizing neutron density responsive apparatus in accordance with the invention.

One suitable system for using a device of the character described is illustrated in Fig. 1. In that figure a source of neutrons which comprises a neutronic reactor is illustrated at 17. The tubular envelope 7 containing the gas is positioned to receive neutron radiation from the reactor 17 as indicated by the dotted lines 19. The spaced electrodes 9 supported in the walls of the envelope 7 are connected to a source of high voltage direct current (not shown) of about 1500 volts by leads 21, 22, 23, 24, and 25, and a condenser 27 having a capacity of 1 microfarad is connected across the sparking electrodes 9.

A current responsive relay 29 is connected in the high voltage circuit between the electrodes 9 and the condenser 27, as shown. This relay includes fixed contacts 31, a moving contact 33, which is biased to the open circuit positioned by a spring 35, an armature 37, and an operating coil 39 for moving the contact 33 to closed circuit position upon energization of the relay operating coil 39. The fixed contacts 31 of the relay 29 are connected by suitable conductors 41, 42, 43, and 44 in series with a source of low voltage potential (not shown), an indicator or alarm 45, and an electrically operated latch 47. The latch 47 is operable to effect the release of a control rod shown diagrammatically at 49 which is adapted to move into the reactor 17 to control or extinguish the reaction taking place therein.

During the operation of the apparatus, the high voltage direct current potential will be applied continuously to the spaced electrodes 9 of the neutron responsive unit and to the condenser 27. As long as the density of the neutron radiation from the reactor 17 is insufficient to produce sufficient ionization within the tube 7 to accomplish breakdown, substantially no current will flow in the high voltage circuit. As soon, however, as the neutron density reaches a predetermined maximum value, the radiation from the neutron absorbing material 15 within the tube 7 (alpha particle radiation when the tube contains boron) will become sufficiently intense to ionize the gas contained within the tube to a point where a spark breakdown will occur between the electrodes 9. At this instant, there will be a surge of current from the condenser 27 and the high voltage source of sufficient magnitude to energize the relay operating coil 39 and effect the operation of the relay. This flow of current will, however, be interrupted almost immediately due to the further action of the condenser 27, the capacity of which is so correlated with the other circuit constants to produce such extinguishment at electrodes 9, and the device will thus be restored to an operative condition. With a suitably selected relay 29, the condenser 27 may be omitted. Its presence is desirable, since the additional current surge thereby provided is a safety factor for relay operation.

Operation of the current responsive relay and closing of the circuit between the relay contacts 31 will in turn effect the operation of the indicating means 45 and the reactor control latch 47. Operation of the latch 47 will release the control rod 49 causing it to move to a position within the reactor 17, as indicated by the dotted outline 51, and extinguishment or slowing of the reaction to a safe value will thereby be effected.

The neutron density at which the electrodes 9 arc is dependent upon a number of considerations, included among which are: the type and spacing of the electrodes, the kind of gas used in the envelope of the device, the pressure at which that gas is maintained, the voltage which is applied to the terminals of the device, and the characteristics of the ionization producing means which are provided within the envelope.

In the foregoing there has been described the features of a novel neutron responsive device which is adapted for use in connection with the control and protection of neutronic reactors and similar devices. The apparatus while simple in design is capable of positively and rapidly effecting the operation of control or indicating means, or both, when the neutron density at the device reaches a predetermined level. The device when employed as shown above automatically restores istelf to an operative condition following each operation thereof. The features of the invention believed to be new are expressly pointed out in the appended claims.

What is claimed is:

1. A neutron responsive device of the class described comprising a sealed, tubularly shaped, glass envelope containing an ionizable gas and a pair of spaced electrodes, one of said electrodes having a pointed inner end of the other of said electrodes having a rounded inner end, and a coating of a material which emits alpha particles upon neutron irradiation thereof applied to the inner surface of said tubular envelope.

2. A neutron responsive device of the class described comprising a vessel containing an ionizable atmosphere, a pair of spaced electrodes within said vessel, one of said electrodes having a pointed inner end and the other of said electrodes having a rounded inner end, and neutron absorbing means disposed within said vessel responsive to neutron irradiation to effect ionization of the atmosphere within the vessel.

3. A neutron responsive device of the class described comprising a sealed envelope containing an ionizable gas, a pair of spaced electrodes within said envelope, one of said electrodes having a pointed inner end and the other of said electrodes having a rounded inner end, and neutron absorbing means disposed within said envelope responsive to neutron irradiation to effect ionization of gas contained within said envelope.

4. A neutron responsive device of the class described comprising a sealed envelope containing an ionizable gas, a pair of spaced electrodes within said envelope, one of said electrodes having a pointed inner end and the other of said electrodes saving a rounded inner end, and a thin coating of boron applied to the inner surface of said envelope.

WALTER H. ZINN.

REFERENCES CITED

The following references are of record in the file of this patent:

UNITED STATES PATENTS

| Number | Name | Date |
|---|---|---|
| 2,036,072 | Mutscheller | Mar. 31, 1936 |
| 2,122,222 | Vingerhoets | June 8, 1938 |
| 2,220,509 | Brons | Nov. 5, 1940 |
| 2,288,718 | Kallmann et al. | July 7, 1942 |
| 2,323,128 | Hare | June 29, 1943 |

FOREIGN PATENTS

| Number | Country | Date |
|---|---|---|
| 114,150 | Australia | May 2, 1940 |
| 114,151 | Australia | Nov. 13, 1941 |
| 233,011 | Switzerland | Oct. 3, 1944 |

OTHER REFERENCES

Greinacher, Helvitica Physica Acta, vol 9, 1936 pgs. 590–595.